Jan. 17, 1928. 1,656,596
J. D. MERRIFIELD
SCREW THREAD CUTTING TOOL
Filed Feb. 19, 1923 3 Sheets-Sheet 1
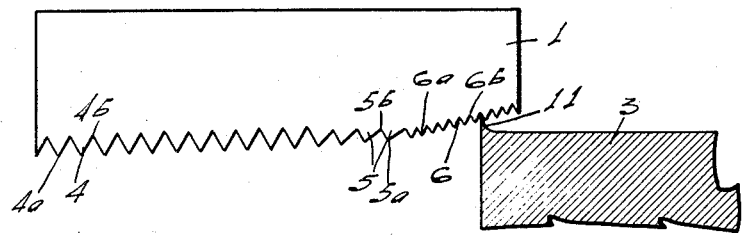
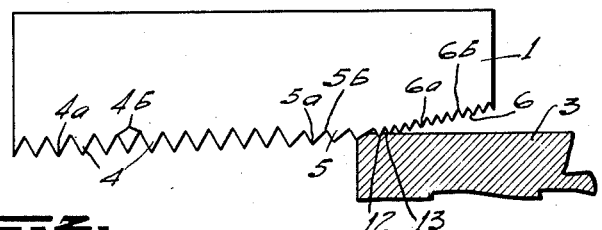
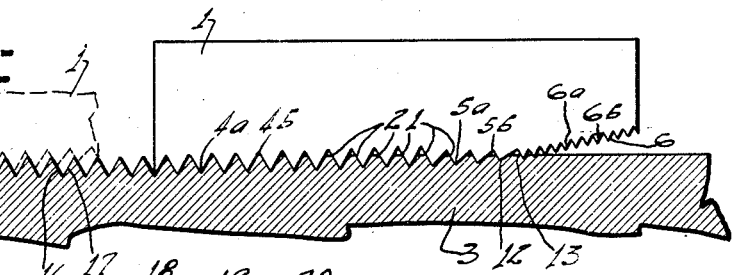
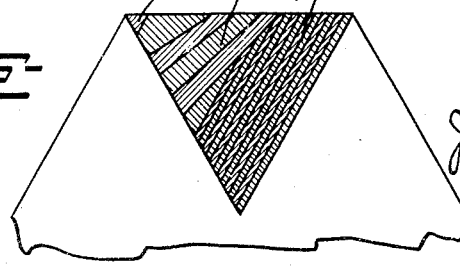

Jan. 17, 1928.
J. D. MERRIFIELD
1,656,596
SCREW THREAD CUTTING TOOL
Filed Feb. 19, 1923     3 Sheets-Sheet 2
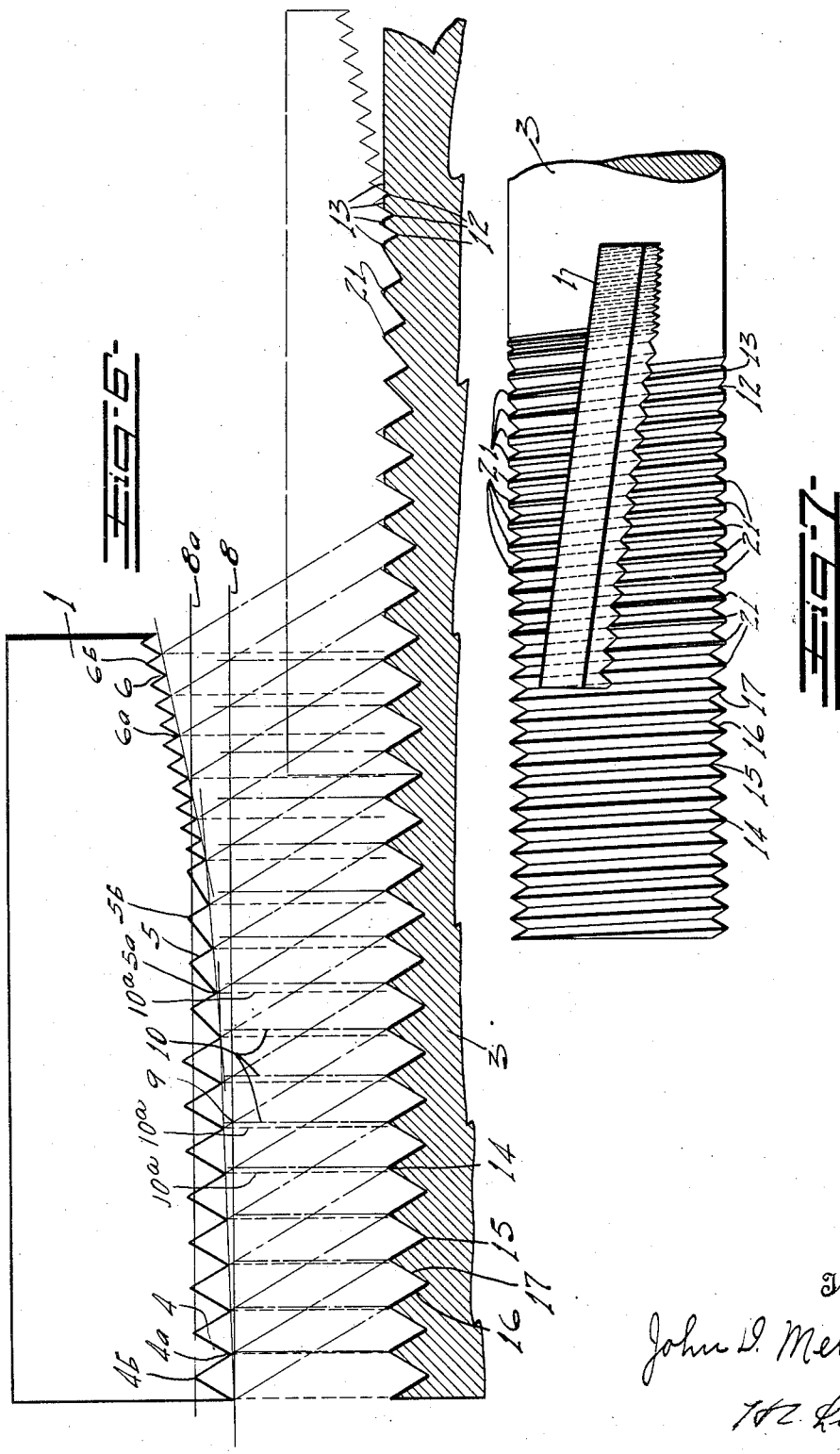
Inventor
John D. Merrifield
Attorney Jan. 17, 1928.
J. D. MERRIFIELD
1,656,596
SCREW THREAD CUTTING TOOL
Filed Feb. 19, 1923
3 Sheets-Sheet 3
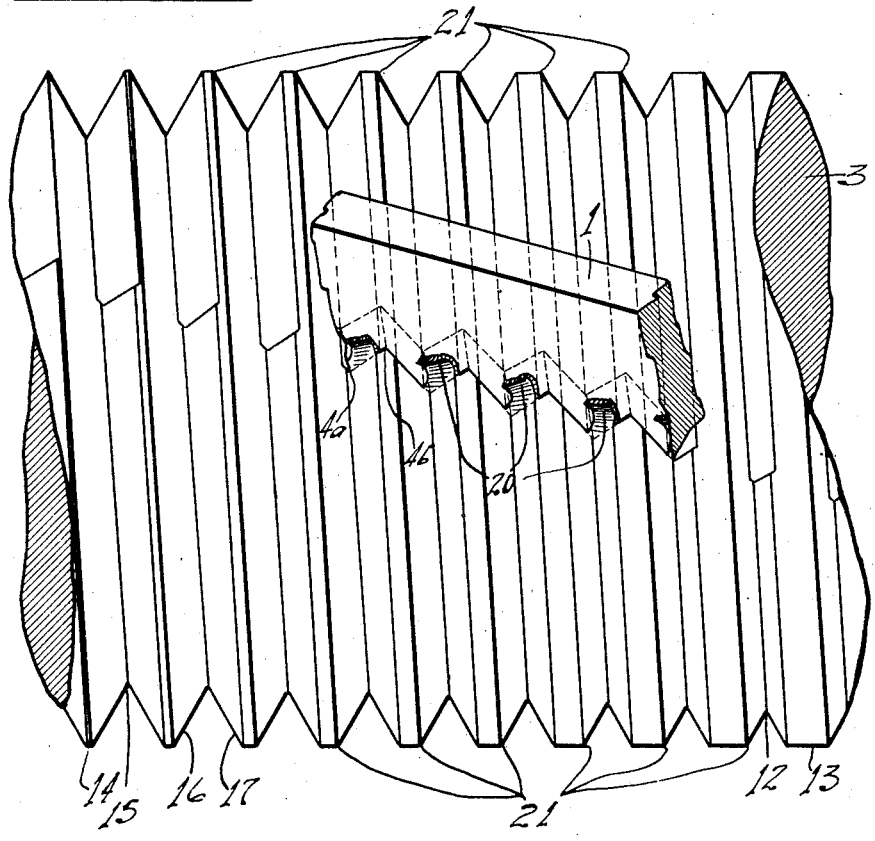
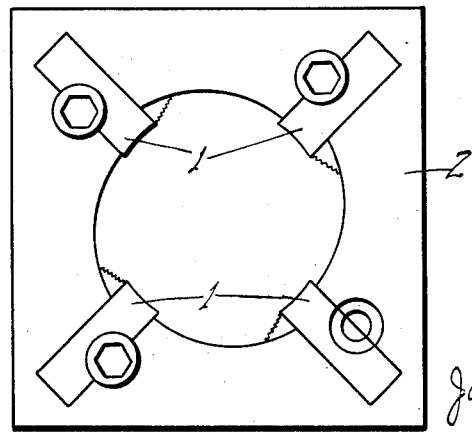
Inventor
John D. Merrifield
by  
Attorney Patented Jan. 17, 1928.

1,656,596

UNITED STATES PATENT OFFICE.

JOHN D. MERRIFIELD, OF ERIE, PENNSYLVANIA, ASSIGNOR TO REED MANUFACTURING COMPANY, OF ERIE, PENNSYLVANIA, A CORPORATION OF PENNSYLVANIA.

SCREW-THREAD-CUTTING TOOL.

Application filed February 19, 1923. Serial No. 619,877.

Heretofore screw threads have been formed with taps and dies so constituted as to remove metal from both slopes of the thread, the distances between the crests of the die or tap teeth coinciding with the distances between the troughs of the threads cut. I have devised a thread cutting tool (exemplified as a die) in which the threads are progressively cut from one or the other slopes of the thread, thus reducing the total cut in producing the thread. This simplifies the making and operation of the devices for making the thread, improves the threads and reduces the effort necessary to make a cut and improves the action of the die in backing off a thread cut. In the present drawings I have exemplified my invention as a die for cutting exterior threads and in forming such die I vary the distances between the crests of the threads and the spirals of the thread cut. Where the cut is made on the forward slope I make the distances between the crests less than the distances between the crests of the finished thread on the article and where it is desired to make the cut on the rear slope I make the distances between the crests greater, the preference being for making the cut on the forward slope. The spiral of the crests of the finished thread follow along one slope of the threads of the die instead of along the center of the trough.

Where this is done it is possible to relieve a die by varying the slope of the tooth relatively to the slope being cut. This is done by giving the die a slightly different spiral than the finished thread, the effect being an axial crowding at the heel of the die on the grinding slope of the thread being cut and a slight relief of the surface of the slope of the die back of the cutting edge.

In forming the thread cutting tool also I prefer to give the chasers forming the die a diagonal angle relatively to the axis of the die giving a side or axial rake to the cutting face of the die. Where this is the advance slope the inclination or angle of the chaser would be inclined to give the proper rake for the advance slope and where the cutting was on the rear slope the angle would be reversed. In addition to this the die may be given the usual radial rake. Where the cut is done on one slope only this diagonal or angular arrangement of the die gives an axially directed rake to the cutting edge without producing a bad effect on the opposing edge of the tooth, that is to say, where the cutting is done on one slope only the angular relation of the die gives the proper rake for this slope but where it is attempted to cut on both slopes the angular relation of the chaser takes away from the rake on one of the slopes to the same extent that it adds to the rake on the other slope. By varying the angular adjustment the feeding action may be controlled, a greater angle of the chaser increasing the feed so as to correct the lag that would naturally follow a feeding action dependent on the die itself.

In making the thread cutting tool of my invention I also provide the die with a throat in which the threads are provided with pointed crests so that as the die is started on the work it removes a spiral groove leaving the intervening material on the rod or material being cut with a flat crest but of sufficient body to prevent stripping. This is the reverse of what is ordinarily accomplished with dies in that the crests of the dies ordinarily are ground off to form a flat trough and pointed crests and thus in attempting to start the die on a bar the trough is flat and hair-like pointed crests extend from the material and these do not have sufficient body to prevent stripping. It is, therefore, possible with my die to start the die on a rod without the usual lead screw.

Further I prefer to form the starting teeth in the early engagement of the die with the angles of the slopes varied making the inclination of the forward slope less abrupt than the inclination of the rear slope so that there is a possibility of crowding the forward slope with a wedging action on to the work.

In furthering this starting capacity of the die I prefer to increase the number of teeth at the starting end of the throat so as to readily follow over an upset end. With the full distances between the crests of the teeth their engagement of such an end precludes the ready following up of the die over this upset portion. Features and details of the invention will appear from the specification and claims.

In the accompanying drawings I have shown a die formed in accordance with my invention as follows:—

Fig. 1 shows a side elevation of a chaser starting on a bar having an upset end.

Fig. 2 a similar view with the die slightly advanced.

Fig. 3 a similar view with the die advanced further on the work.

Fig. 4 a view of the die advanced on the work forming a portion of the finished thread, the view showing in dash lines the die as it is being removed.

Fig. 5 a sectional view illustrating the successive cuts in forming the thread.

Fig. 6 a diagrammatical view showing the relation of the threads cut to the threads on the chaser.

Fig. 7 a plan view of the chaser on a thread being cut.

Fig. 8 an elevation of a solid die of the common type in which the chasers may be used.

Fig. 9 an enlarged view showing the relations of the threads on the chaser to the work as the chaser advances.

1 marks the chaser, 2 a die in which the chasers are mounted. The die body as shown is usually termed a solid die. It should be understood, however, that the chasers may be otherwise mounted if desired. 3 marks a bar being cut.

The chaser has the threads 4 which finally shape the thread being cut, the starting threads 5 having an inclination as heretofore suggested less abrupt on the forward slope than the rear slope and the fine threads 6, the principal function of which is to facilitate starting with an upset end on the bar. The threads 4 have the crests $4^a$ and the troughs $4^b$; the threads 5 the crests $5^a$ and troughs $5^b$; and the threads 6 the crests $6^a$ and troughs $6^b$. The starting threads 6 have pointed crests and are tapered forming the throat of the die and the crests are closer together, the threads being multiple threads of the lead of the thread 4. As shown in Fig. 6 I have carried the crests of the threads 4, 5 and 6 to the threads of a bar cut indicating the relation between these crests. I have also indicated a line 8 which is parallel to the axis of the bar to be cut and coincident with the trough of the finished thread, or in other words coincident with the crests of the last cutting tooth of the die. I have also shown a line $8^a$ coinciding with the crests of the finished thread. I have in Fig. 6 extended by dash lines the rearward slopes of the die, these ordinarily being thirty degrees to lines at right angles to the axis of the die and have noted the points of intersection of these extended slopes with the line 8 at 9 and have extended by dash lines 10 these points of intersection showing that these points of intersection correspond with the crests of the threads finally cut. I have also provided dash lines $10^a$ which extend from the crests $4^a$ of the die at right angles to the axis of the die. By observing the varying distances between the points of intersection 9 and the points of intersection between the lines $10^a$ and line 8 the variation in distances between the crests of the die and the crest of the finished thread in a general way is indicated, the initial cuts being quite offset and this being gradually reduced to the point where the final cutting slope reaches the crest at the left of Fig. 6. The general shape of the threads as they are formed, however, is indicated at the right of Fig. 6 in the part of the work directly under the chaser as shown in dash lines indicating the transformation of the threads in the process of the chaser.

In Fig. 1 I have shown the upset end 11 of the bar as it is engaged by the teeth 6.

In Fig. 2 the first of the threads 5 have removed this upset portion and the crest of the small threads 6 has formed a threaded groove in the bar. It will be noted that the material between the initial grooves 12 is flat as at 13 and thus there is a large body of the softer metal of the bar which is opposed to the stripping of the thread. This is the reverse of the ordinary cutting die and is one of the factors in making it possible to start this die on a bar without the usual lead screw, the other factor being, as heretofore expressed, the less abrupt inclination of the forward slopes of the starting threads 5.

The finished thread appears in Fig. 4 with the crests 14, troughs 15, forward slope 16 and rearward slope 17 and in Fig. 5 I have shown the cut 18 made by the tooth 6, the cuts 19 made by the starting teeth 5 and the following cuts 20 made by the teeth 4 along the rearward slope of the thread being cut by the forward slope of the die. One of the starting threads is continued in the finished thread while the thread intermediate this starting thread is removed first partially by the cutting teeth 5 having the variable slope and finally by the finishing thread.

It will be noted that the spiral 21 along the front edge of the flat crest as the thread is formed finally becomes the crest of the thread (assuming the bar has a diameter of the crest of the thread) and thus the spiral 21 follows along the rear slope of the die thread and that the rearward slope of the die coincides at all times with the forward slope of the thread as it is formed and crowds the cutting edge of the die into the rearward slope of the work being cut. It will be noted by observing Fig. 9 that the spiral formed by the crests of the die is slightly faster than the thread cut. The effect of this is a crowding of the heel along the guiding rear slope and a slight relief of the slope of the die back of the cutting edge through the lack of coincidence between the slope of the die back of the cutting edge and the slope cut.

I prefer to arrange the die diagonally with an angle as clearly shown in Fig. 7. This gives, it will be seen a cutting rake in an axial direction to the cutting edge along the forward slope of the tooth of the die in relation to the rearward slope of the thread being cut and on which the cut is made. This is of particular advantage in a die cutting only on the forward slope in that the negative rake along the rear slope making no cut, or practically no cut, this negative rake at the rear is not detrimental. This diagonal arrangement of the die is of particular advantage in that it may be varied to correct the self lead of the die. By giving a greater inclination it has a greater tendency to bite in and increase the lead. By making the chaser parallel with the axis the die has a tendency to lag from the desired lead. By properly adjusting the angle the die may be made self-leading with correct pitch.

It will be understood that this die makes a continuous chip or ribbon as distinguished from the crumbled chip where the cut is on both slopes and consequently has to curl a channel-shaped cross section of metal. The throw of this chip in this die can be controlled to a certain extent by varying the diagonal relation, or angle of the setting of the chaser. This, as before stated, is possible because of the cut being made on one slope the added rake given by changing the angle of the chaser is not detrimental because of the absence of any material cut on the opposite slope. By changing the throw of the clip in relation to the general construction of the die, the die can be better made to clear itself of chips. Ordinarily it will pass the chip out of the rear of the die with the die cutting as shown in the drawings, or it will throw the chip to the front of the die where the rear slope of the thread being cut is the one acted upon, the angularity of the chaser under this condition being reversed. This die cutting only on one slope backs off with greater ease and with less chip interference than the ordinary die. This seems to be due to the fact that the chips are all on one side and the teeth as they back away clear this wall.

While I have shown and described my invention in the form of a die for cutting external threads and also as cutting along the forward slope of the threads of the die, it will be understood that I do not wish to be limited in the broader features of my invention to a die, or to a die cutting this slope as the broad principles of my invention may be carried out on other articles than those having external threads and that the cutting may be made on other than the rearward slope of the thread being cut.

What I claim as new is:—

1. A screw thread cutting die having the spiral of the crests of the thread to be cut by the die following along one slope of the teeth of the die.

2. A screw thread cutting die having the spiral of the crests of the thread to be cut by the die following along one slope of the teeth of the die, the cutting edge of the teeth being at the face of the opposite slope.

3. A screw thread cutting tool having the spiral of the crests of the thread to be cut following along one slope of the teeth of the tool, the crest of the teeth being inclined to the spiral of the crests of the teeth to be cut and adapted to crowd the cutting side of the slope at the face against the slope being cut through the crowding engagement of the heel of the slope opposite the cutting face.

4. A screw thread cutting die having a tapered throat, the teeth of the throat having pointed crests and with the slopes of said teeth at different angles to the axis of the die.

5. A screw thread cutting die having a tapered throat, the teeth of the throat having pointed crests and with the slopes of said teeth at different angles to the axis of the die, the forward slope in the direction of the cutting movement of the die having a less abrupt inclination than the rear slope.

6. A screw thread cutting die having a plurality of teeth, the distance between the crests of the teeth varying from the distance between the turns of the spiral to be cut by the teeth, said die having a tapered throad having teeth with pointed crests.

7. A screw thread cutting die having a plurality of teeth, the distance between the crests of the teeth varying from the distance between the turns of the spiral to be cut by the teeth, said die having a tapered throat having teeth with pointed crests, the slopes of said teeth at the throat being at different angles to the axis of the die.

8. A screw thread cutting die having a plurality of teeth, the distance between the crests of the teeth varying from the distance between the spirals to be cut by the teeth, said die having a tapered throat having teeth with pointed crests, the slopes of said teeth at the throat being at different angles to the axis of the die, the forward slope in the direction of the cutting movement of the die having a less abrupt inclination than the thread cut by the die.

9. A screw thread cutting die having a plurality of teeth spaced and spiraled to follow one slope of each thread being cut and cut the opposite slope, said die having a tapered throat having teeth with pointed crests, the slopes of the teeth in the throat being at different angles to the axis of the die.

10. A screw thread cutting die having a plurality of teeth spaced and spiraled to follow one slope of each thread being cut and cut the opposite slope, said die having a tapered throat having teeth with pointed crests, the slopes of the teeth in the throat being at different angles to the axis of the die, the forward slope in the direction of the cutting movement of the die having a less abrupt inclination than the rear slope.

11. A screw thread cutting die having the spiral of the crests of the thread to be cut following along one slope of the teeth of the die, said die having a tapered throat having teeth with pointed crests.

12. A screw thread cutting die having the spiral of the crests of the thread to be cut following along one slope of the teeth of the die, said die having a tapered throat having teeth with pointed crests, the slopes of said teeth in the throat being at different angles to the axis of the die.

13. A screw thread cutting die having thread cutting teeth, a tapered throat, and teeth in the tapered throat in advance of the thread cutting teeth having the forward slope in the direction of the cutting movement of the die of less abrupt inclination than the thread cutting teeth.

14. A screw thread cutting tool having thread cutting teeth and pointed starting teeth, the starting teeth being tapered and of the same lead but finer and with the crests closer together than the thread cutting teeth.

15. A screw thread cutting die having thread cutting teeth and a tapered throat provided with pointed starting teeth, the starting teeth being of the same lead but finer and with the crests closer together than the thread cutting teeth.

16. A screw thread cutting tool having thread cutting teeth and pointed starting teeth, the starting teeth being in the form of plural threads and of the same lead but finer than the thread cutting teeth, one of the threads of the starting teeth being a continuation of the spiral of the thread cutting teeth.

17. A screw thread cutting die having thread cutting teeth and a throat provided with pointed starting teeth, said starting teeth being in the form of plural threads of the same lead but finer than the thread cutting teeth, one of the threads of the starting teeth being a continuation of the spiral of the thread cutting teeth.

18. A screw thread cutting tool having thread cutting teeth, an intermediate set of teeth in advance of the thread cutting teeth having their front slopes in the direction of the cutting movement of the die more inclined than the rear slope of the teeth; and pointed starting teeth in advance of the intermediate teeth finer and with the crests closer together than the thread cutting teeth but of the same lead.

19. A screw thread cutting tool having thread cutting teeth spaced and spiraled to follow one slope of each thread being cut and to cut the opposite slope, intermediate teeth in advance of the thread cutting teeth having the front slope in the direction of the cutting movement of the die of said teeth more inclined than the slope of the thread cutting teeth, and pointed starting teeth in advance of the intermediate teeth, said starting teeth being of the same lead but finer and with the crests closer together than the thread cutting teeth.

20. In a screw thread cutting die, the combination of thread cutting teeth; a throat having intermediate teeth with their front slopes more inclined than the slope in the direction of the cutting movement of the die of the thread cutting teeth; and pointed starting teeth in advance of the intermediate teeth finer and with the crests closer together than the thread cutting teeth but of the same lead.

21. In a screw thread cutting die, the combination of thread cutting teeth spaced and spiraled to follow one slope of each thread being cut and to cut the opposite slope; a throat having intermediate teeth with its forward slope in the direction of the cutting movement of the die more inclined than the slope of the thread cutting teeth; and pointed starting teeth in advance of the intermediate teeth, said starting teeth being finer and with the crests closer together but of the same lead as the thread cutting teeth.

22. A screw cutting tool having the spiral of the crests of the thread to be cut by the tool following along one slope of the teeth of the tool.

23. A screw thread cutting tool having the spiral of the crests of the threads to be cut by the tool following along one slope of the teeth of the tool, the cutting edge of the teeth being at the face of the opposite slope.

In testimony whereof I have hereunto set my hand.

JOHN D. MERRIFIELD.